United States Patent
Numata et al.

(10) Patent No.: US 6,728,494 B2
(45) Date of Patent: Apr. 27, 2004

(54) LIGHT-EMITTING DEVICE DRIVE CIRCUIT, AND OPTICAL TRANSMISSION SYSTEM USING THE CIRCUIT

(75) Inventors: Kazunori Numata, Neyagawa (JP); Satoshi Furusawa, Osaka (JP); Susumu Morikura, Yawata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 570 days.

(21) Appl. No.: 09/854,527

(22) Filed: May 15, 2001

(65) Prior Publication Data

US 2001/0050795 A1 Dec. 13, 2001

(30) Foreign Application Priority Data

Jun. 8, 2000 (JP) .......................... 2000-172467

(51) Int. Cl.$^7$ ............................................... H04B 10/04
(52) U.S. Cl. .................... 398/182; 315/209 R; 330/288; 327/109
(58) Field of Search ...................... 315/209 R; 330/288; 327/109; 398/182, 192, 186

(56) References Cited

U.S. PATENT DOCUMENTS

| | | | | |
|---|---|---|---|---|
| 4,122,401 A | * | 10/1978 | Sauer | 330/257 |
| 4,819,241 A | * | 4/1989 | Nagano | 372/38.03 |
| 4,835,489 A | * | 5/1989 | Monticelli | 330/277 |
| 5,140,175 A | * | 8/1992 | Yagi et al. | 327/109 |
| 5,739,717 A | * | 4/1998 | Nakamura | 327/514 |
| 6,037,832 A | * | 3/2000 | Kaminishi | 327/538 |
| 6,097,159 A | * | 8/2000 | Mogi et al. | 315/151 |
| 6,369,638 B2 | * | 4/2002 | Okubo | 327/423 |

FOREIGN PATENT DOCUMENTS

| | | |
|---|---|---|
| JP | 9-083442 | 3/1997 |
| JP | 9-270555 | 10/1997 |

\* cited by examiner

Primary Examiner—Hung N. Ngo
(74) Attorney, Agent, or Firm—Wenderoth, Lind & Ponack, L.L.P.

(57) ABSTRACT

A digital electrical signal Vin for transmission is supplied to a transistor Q12, a current compensation circuit 11, and a signal current source 13 to be band-compensated for generating a signal current I0. A predetermined current Id for a constant-current source 14 is subtracted from the signal current I0, and the result is an injection current Iin that drives an LED 15. The current Id is adjusted so that the injection current Iin becomes 0 at the low level. Thus, a signal-to-noise (S/N) ratio in waveform of light outputted from the LED 15 can be improved. Accordingly, the S/N ratio of the transmitted signal can be improved with band compensation.

72 Claims, 5 Drawing Sheets

F I G. 3
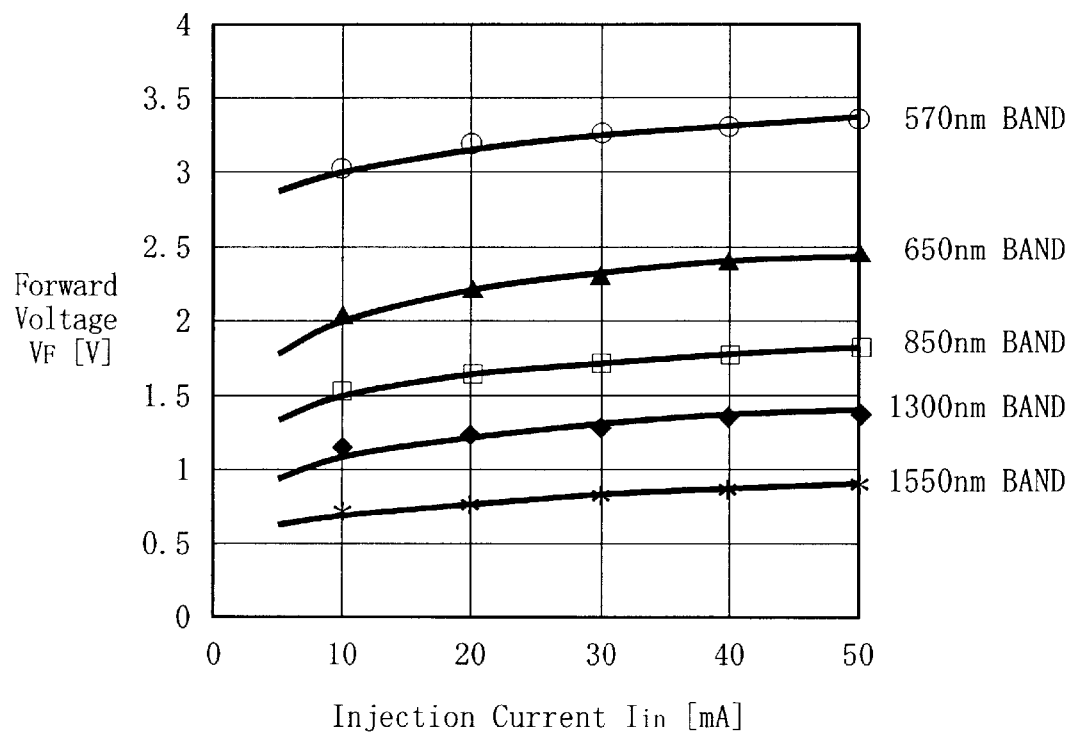

LIGHT-EMITTING DEVICE DRIVE CIRCUIT, AND OPTICAL TRANSMISSION SYSTEM USING THE CIRCUIT

BACKGROUND OF THE INVENTION

1. Field of the Invention

This invention relates to light-emitting device drive circuits and optical transmission systems using the circuits and, more specifically, to the circuits for driving a light-emitting device used for an optical transmission circuit and other circuits in an optical communication apparatus, and an optical transmission system using the light-emitting device drive circuit.

2. Description of the Background Art

As being well known, with recent advancement of technology, optical fibers have been able to achieve wideband, low-loss transmission. Therefore, the optical fibers have come to be applied more to a backbone system for high-speed, large-capacity transmission carried out typically over the Internet. In the future, the optical fibers are expected to be applied further to a backbone-to-home access system, home network, and other networks.

To achieve such next-generation digital home networks, an interface, which is able to transmit a large amount of digital signals at high speed for a long distance with high quality and at low cost, is needed. Among potential protocols of such interface is IEEE 1394, which standardizes digital signals of 100 Mbps, 200 Mbps, 400 Mbps, and other transmission rates. Under IEEE 1394, however, a transmission medium for use is implemented by an electrical cable, which enables transmission only for a short distance of 4.5 m. To make the distance far longer, the transmission should be optically achieved by using an optical fiber, which is not affected by disturbance due to electromagnetic waves, instead of using the electrical cable.

The optical fibers are exemplarily classified into glass optical fibers (hereinafter, GOFs), polymer-clad fibers (hereinafter, PCFs), and plastic optical fibers (hereinafter, POFs), according to the difference of materials. The GOFs are suitable for long-distance transmission over the backbone system, for example, because of their extremely small transmission loss. However, the GOF's core through which an optical wave passes is so small in diameter (10 to 50 $\mu$m) that connectors and other components used in the system have to be made with high accuracy, thereby increasing their manufacturing cost. Moreover, the GOF's core is made of glass, which is inflexible and easy to be broken, and therefore extreme caution is required in handling the GOFs. The PCF's core is no less than 200 $\mu$m in diameter, which is larger than that of the GOFs, but also made of glass as the GOF's core. Therefore, extreme caution is required also in handling the PCFs. On the other hand, the POF's core is approximately 1 mm in diameter, which is extremely larger than those of the other two, and therefore connectors and other components used in the system can be made without requiring high accuracy, thereby reducing their manufacturing cost. Moreover, the POFs are entirely made of plastic material, and therefore they are easy to handle and pose no danger for use at home. Therefore, a POF optical transmission technique based on IEEE 1394 is coming to more attention for realizing an interface of the next-generation digital home network.

The POF's core is generally made of polymethyl methacrylate (hereinafter referred to as PMMA) type material. FIG. 4 shows transmission loss characteristics of a PMMA-type POF with respect to a wavelength $\lambda$. As shown in FIG. 4, low transmission loss is observed in optical waves with their wavelength bands ranging from 450 to 540 nm, from 560 to 580 nm, and from 640 to 660 nm. Therefore, for high-speed and long-distance signal transmission, a light source suitable for one of those wavelength bands should be selected. For example, a light source for a wavelength band of 640 to 660 nm is selected. Furthermore, in consideration of cost and eye safety when a user directly views light, the light source for use at home or other purposes is preferably a light-emitting diode (hereinafter, LED) rather than a semiconductor laser diode (LD). For this reason, one potential interface is realized by an optical transmission system using the POF and the LED for the wavelength band within 640 to 660 nm.

However, if the LED is selected as the light source, what is concerned is how fast the response is. More specifically, the LED for 640 to 660 nm has a frequency bandwidth of approximately 100 MHz, and therefore digital signals of 200 or 400 Mbps under IEEE 1394 cannot be transmitted through this LED. Therefore, a method of compensating the LED's bandwidth has been suggested using an electrical circuit.

One example of a conventional light-emitting device drive circuit used in an optical transmission circuit is disclosed in Japanese Patent Laid-Open Publication No. 9-83442 (1997-83442). FIG. 5 is a schematic diagram showing the structure of the conventional light-emitting device shown in this publication. FIG. 6 shows an example of a signal waveform at each component of the conventional light-emitting device drive circuit of FIG. 5. In FIG. 5, the conventional light-emitting device drive circuit includes a signal current source 41 for outputting a signal current i1 corresponding to a transmission signal, a differential current source 42 for outputting a differential current i2 corresponding thereto, a signal adder 43, and a light-emitting device 44.

In general, if the light-emitting device 44 whose bandwidth is insufficient for the transmission signal is driven only by the signal current i1 having a rectangular waveform shown in (a) of FIG. 6, a light output Pout outputted from the light-emitting device 44 has such a waveform as that of the transmission signal with blunt rising and falling edges ((e) of FIG. 6). Such waveform is caused due to the capacity and internal resistance of the light-emitting device 44 itself. With such structure, transmitting an optical signal at high speed can not be achieved. On the other hand, the differential current i2 has a differential waveform with its steep peaks appearing at the rising and falling edges of the transmission signal ((b) of FIG. 6). Therefore, the signal current i1 having a rectangular waveform and the differential current i2 having the differential waveform are added together by the signal adder 43, and an output therefrom is an injection current Iin having a waveform with its steep peaks appearing at the rising and falling edges of the transmission signal. This injection current Iin drives the light-emitting device 44, and an output therefrom is the light output Pout having a desired band-compensated waveform (rectangular waveform) ((d) of FIG. 6).

As being evident from (d) of FIG. 6 showing the waveform of the light output Pout, the light-emitting device 44 constantly emits light even though the digital signal is at the low level (L) (refer to a slanted part in the drawing). Such light emission is unavoidable because predetermined direct current components have to be included in the injection current Iin for preventing waveform distortion that occurs when the peak value at the falling edge of the injection current Iin becomes below zero. If not prevented, this distortion leads to distortion in waveform of the light outputted from the light-emitting device 44.

Such light emission, however, acts as noise, affecting the transmission characteristics to deteriorate a signal-to-noise (S/N) ratio of the digital signal after transmission.

SUMMARY OF THE INVENTION

Therefore, an object of the present invention is to provide a light-emitting device drive circuit and an optical transmission system using the circuit that ensure good transmission capabilities by compensating the bandwidth and also bringing the low level of the light output waveform down to zero (or approximately zero) to improve the S/N ratio of the digital signal.

The present invention has the following features to attain the object above.

A first aspect of the present invention is directed to a circuit that drives a light-emitting device based on an inputted digital signal, the circuit comprising:

an npn transistor, supplied at a base thereof with an electrical signal corresponding to the digital signal, for outputting a voltage at a high or low level to an emitter thereof based on the electrical signal;

a current compensation circuit, connected to the emitter of the transistor, for compensating an output current of a collector of the transistor at a rising edge when an emitter voltage of the transistor is at the high level, and at a falling edge when the emitter voltage of the transistor is at the low level;

a signal current source, connected to the collector of the transistor, for amplifying the output current by a predetermined multiplication factor, and outputting a signal current;

a constant-current source, connected to the signal current source in serial, for diverting a part of direct current components of the signal current outputted from the signal current source; and a light-emitting device, connected to the signal current source in serial and to the constant-current source in parallel and supplied with an injection current obtained by subtracting the diverted part from the signal current, for emitting light based on the injection current.

As stated above, in the first aspect, the current compensation circuit carries out bandwidth compensation, and the injection current obtained by subtracting a part from the signal current drives the light-emitting device. Thus, light emission when the digital signal is low can be sufficiently suppressed at the time of bandwidth compensation of the light-emitting device. Accordingly, deterioration in S/N ratio can be suppressed, thereby achieving high-quality, long-distance transmission.

Here, the current compensation circuit is preferably structured by a first resistor with one end thereof connected to the emitter of the transistor, a second resistor with one end thereof connected to the other end of the first resistor and with the other end grounded, and a capacitor connected to the first resistor in parallel.

Further, the signal current source is a current mirror amplifier composed of at least two pnp transistors.

Still further, the light-emitting device is supplied with the injection current at an anode thereof and is grounded at a cathode thereof.

Still further, the light-emitting device emits light with a wavelength having an optical spectral characteristic of a band from 450 to 540 nm, 560 to 580 nm, or 640 to 660 nm.

Thus, light emission when the digital signal is low can be sufficiently suppressed and, accordingly, deterioration in S/N ratio can be suppressed. Therefore, long-distance transmission can be achieved with high quality.

A second aspect of the present invention is directed to an optical transmission system for transmitting, through a transmission medium, an optical signal outputted from a light-emitting device drive circuit that drives a light-emitting device based on an inputted digital signal, the light-emitting device drive circuit includes
an npn transistor, supplied at a base thereof with an electrical signal corresponding to the digital signal, for outputting a voltage at a high or low level to an emitter thereof based on the electrical signal;

a current compensation circuit, connected to the emitter of the transistor, for compensating an output current of a collector of the transistor at a rising edge at when an emitter voltage of the transistor is at the high level, and at a falling edge when the emitter voltage of the transistor is at the low level;

a signal current source, connected to the collector of the transistor, for amplifying the output current by a predetermined multiplication factor, and outputting a signal current;

a constant-current source, connected to the signal current source in serial, for diverting a part of direct current components of the signal current outputted from the signal current source; and a light-emitting device, connected to the signal current source in serial and to the constant-current source in parallel and supplied with an injection current obtained by subtracting the diverted part from the signal current, for emitting light based on the injection current, wherein to the transmission medium, at least part of an optical signal outputted from the light-emitting device is coupled, and the transmission medium is capable of transmitting at least part of the coupled optical signal.

Here, the current compensation circuit is preferably structured by a first resistor with one end thereof connected to the emitter of the transistor, a second resistor with one end thereof connected to the other end of the first resistor and with the other end thereof grounded, and a capacitor connected to the first resistor in parallel.

Further, the signal current source is a current mirror amplifier structured by at least two pnp transistors.

Still further, the light-emitting device is supplied with the injection current at an anode thereof and is grounded at a cathode thereof.

Still further, the light-emitting device emits light with a wavelength having an optical spectral characteristic of a band from 450 to 540 nm, 560 to 580 nm, or 640 to 660 nm.

As such, in the second aspect, provided is the transmission medium to which at least part of the optical signal outputted from the light-emitting device of the light-emitting device drive circuit in the first aspect is coupled, and the transmission medium transmits at least part of the coupled optical signal. Thus, the optical transmission system according to the second aspect can realize high-quality, long-distance transmission by suppressing deterioration in S/N ratio of the digital signal after transmission.

For the transmission medium, a PMMA-type POF is preferably used. Thus, high-quality, long-distance transmission can be achieved more effectively with the POF.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing one example of forward voltage VF-injection current Iin characteristics with respect to center wavelengths of light emitted from the LED 15;

DESCRIPTION OF THE PREFERRED EMBODIMENT

One embodiment of the present invention is now described with reference to FIGS. 1 to 3.

Figure 1:
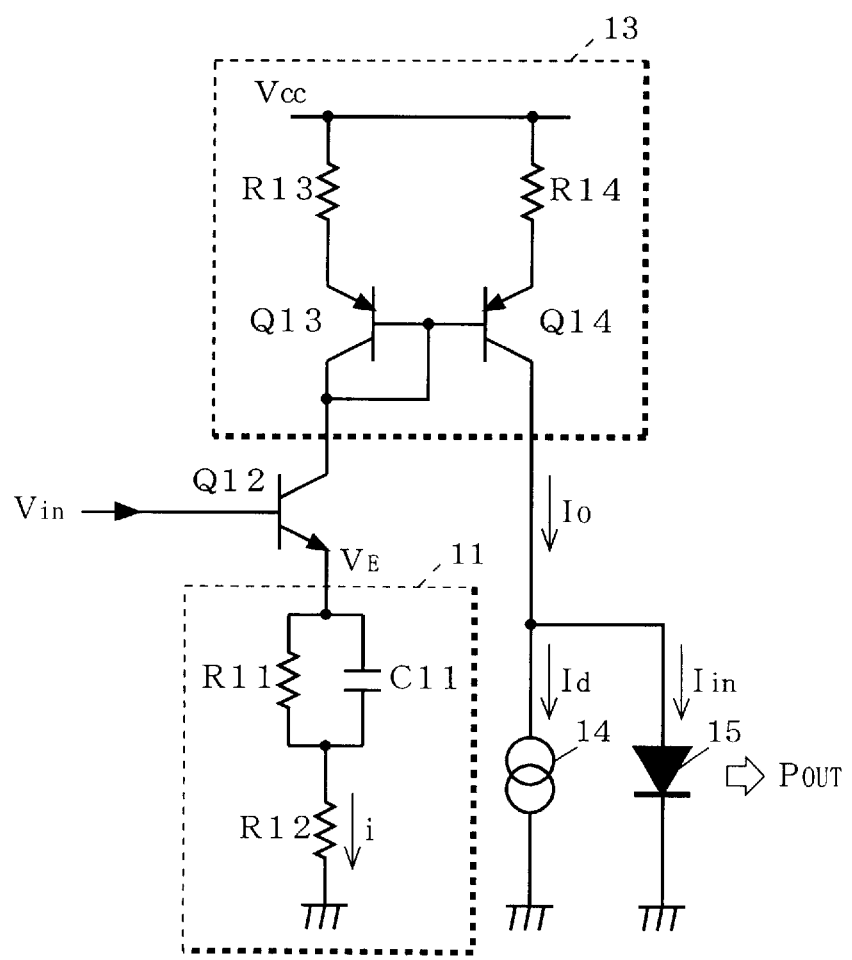
FIG. 1 is a diagram showing the structure of a light-emitting device drive circuit according to one embodiment of the present invention.

With reference to FIG. 1, described first is the structure of a light-emitting device drive circuit according to one embodiment of the present invention.

In FIG. 1, the light-emitting device drive circuit according to the present invention is structured by an npn transistor Q12, a current compensation circuit 11, a signal current source 13, a constant-current source 14, and an LED 15. The current compensation circuit 11 is structured by resistors R11 and R12, and a capacitor C11. The signal current source 13 is structured by a pair of pnp transistors Q13 and Q14, and resistors R13 and R14.

The light-emitting device drive circuit of the present invention can be also used for an optical transmission system in which a light output Pout from the LED 15 is transmitted through an optical fiber such as a POF to an optical receiving device.

The transistor Q12 receives, at its base, a digital electrical signal Vin for transmission. The resistor R11 and the capacitor C11 are connected to each other in parallel, and each one end thereof is connected to the emitter of the transistor Q12, while the other end thereof is grounded through the resistor R12. Thus, the current compensation circuit 11 forms a differentiating circuit. The base and collector of the transistor Q13 and the base of the transistor Q14 are connected to one another at a common point, and they are further connected to the collector of the transistor Q12. To the emitter of the transistor Q13, power voltage Vcc is applied through the resistor R13. To the emitter of the transistor Q14, the power voltage Vcc is applied through the resistor R14. Thus, the signal current source 13 forms a current mirror circuit. The collector of the transistor Q14 is connected to the constant-current source 14 and also to the anode of the LED 15. The cathode of the LED 15 is grounded.

Figure 2:
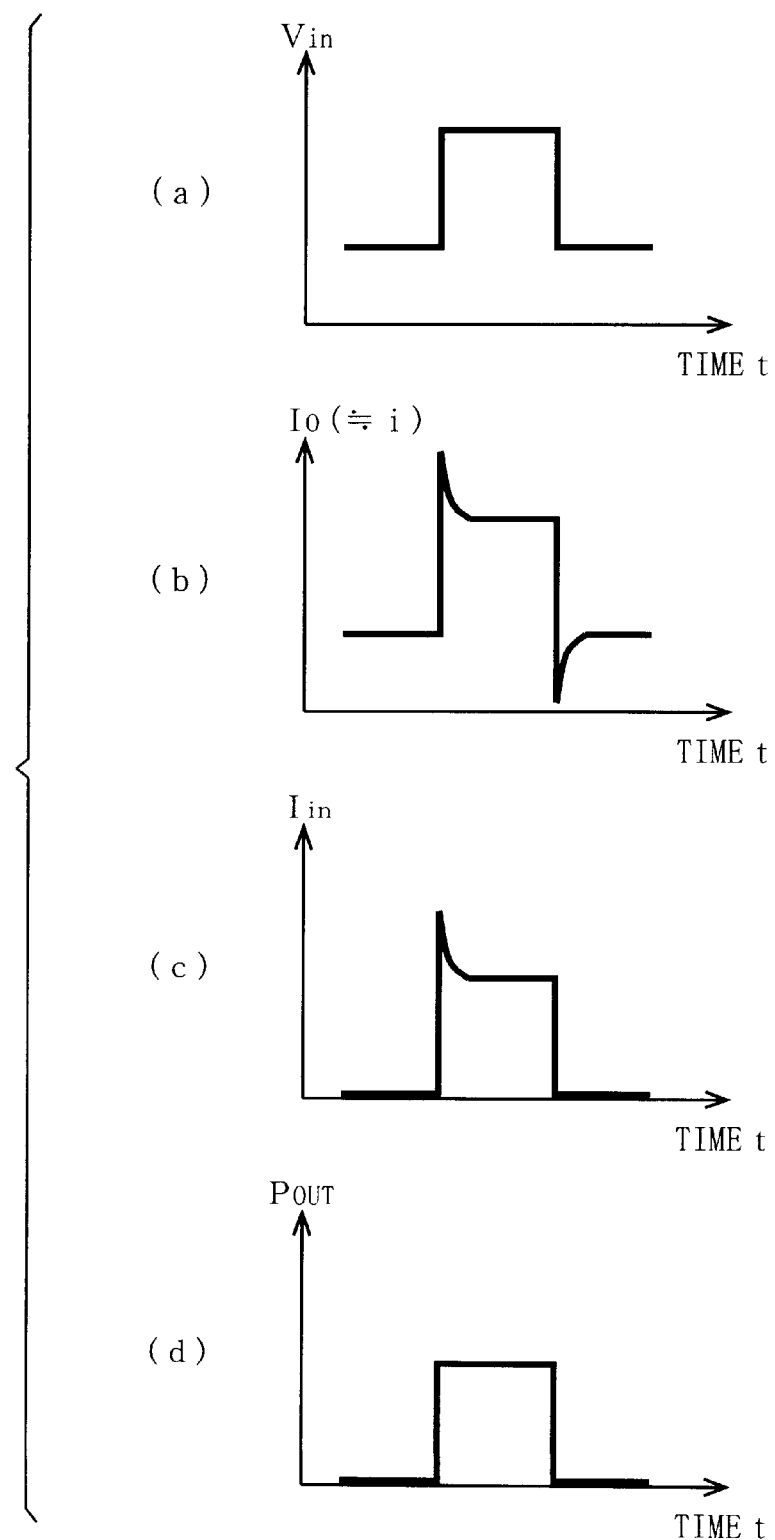
FIG. 2 shows diagrams illustrating examples of signal waveforms at components in the light-emitting device drive circuit according to the embodiment of the present invention.
Figure 4:
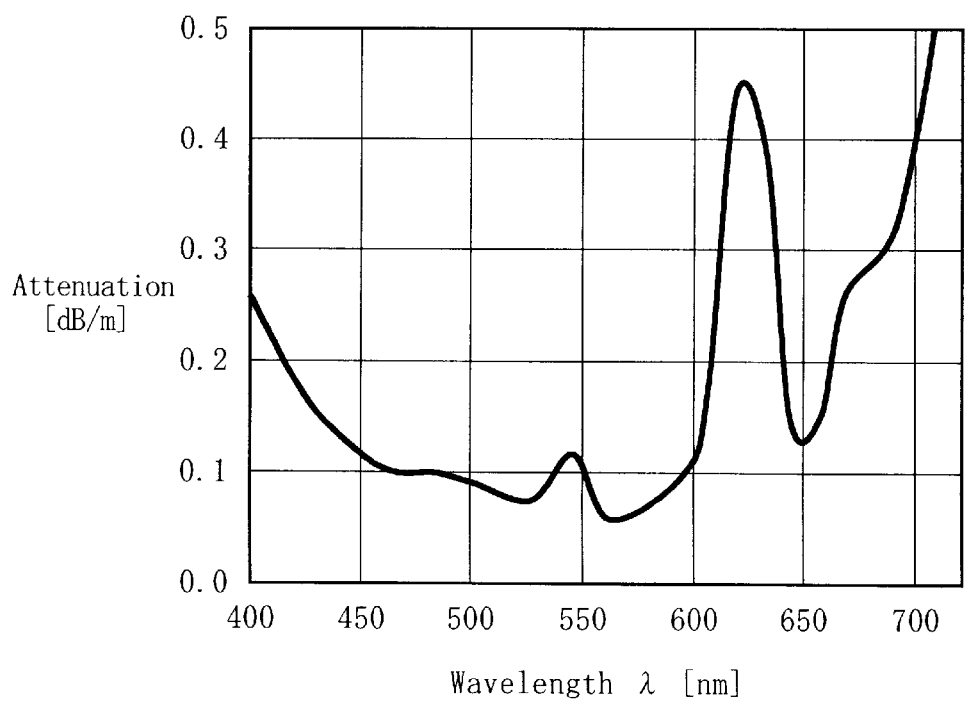
FIG. 4 is a diagram showing transmission characteristics of a PMMA-type POF with respect to a wavelength $\lambda$.
Figure 5:
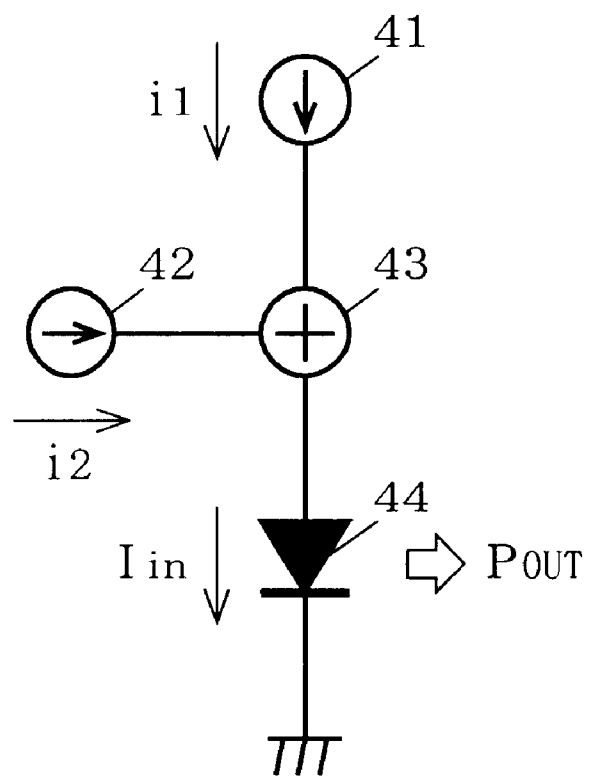
FIG. 5 is a schematic diagram showing the structure of a conventional light-emitting device drive circuit.
Figure 6:
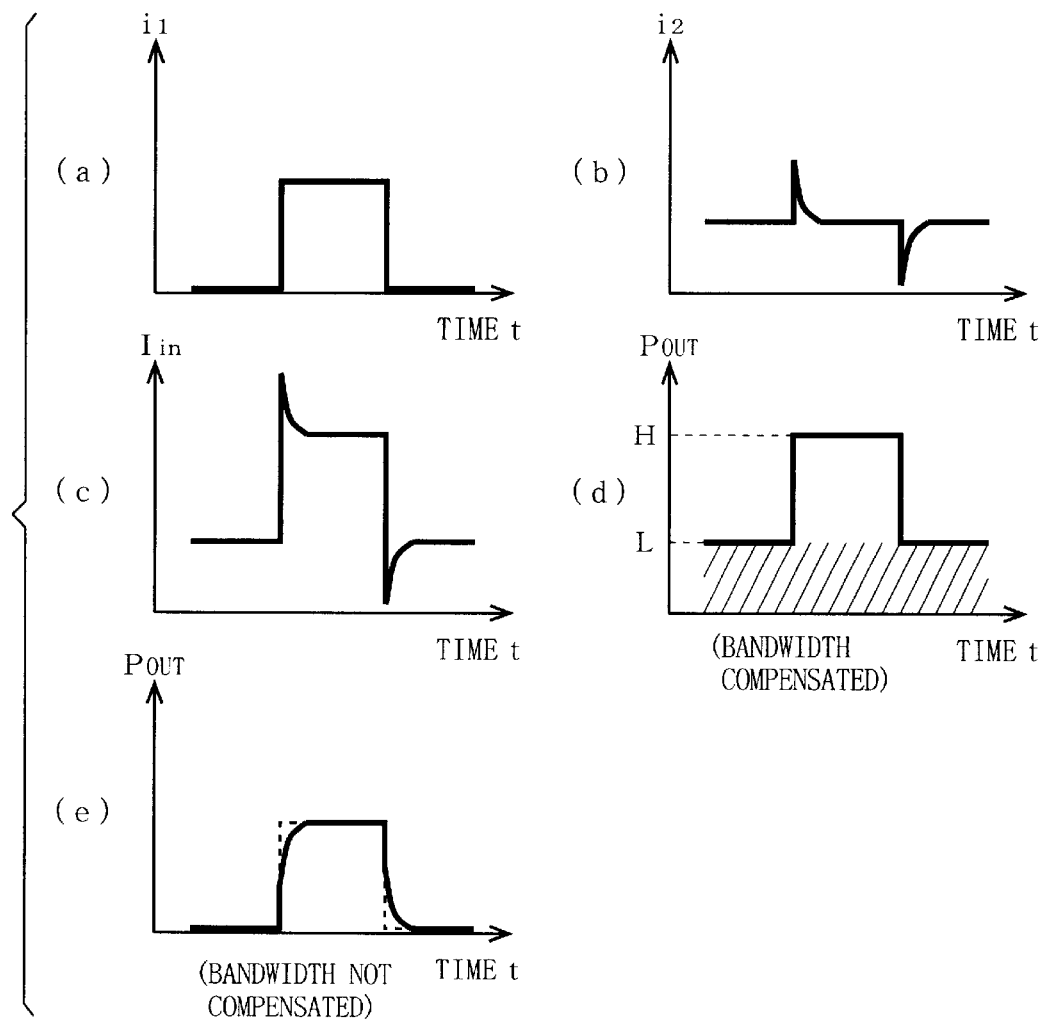
FIG. 6 shows diagrams illustrating examples of signal waveforms at components in the conventional light-emitting device drive circuit.

Next, further with reference to FIG. 2, the operation of the light-emitting device drive circuit according to the embodiment of the present invention is described. FIG. 2 shows diagrams illustrating examples of signal waveforms at the components in the light-emitting device drive circuit according to the embodiment of the present invention.

When the electrical signal Vin ((a) of FIG. 2) supplied to the base of the transistor Q12 becomes high, emitter voltage VE at the emitter of the transistor Q12 becomes constant at the high level. At this moment in time, a current flows only through the capacitor C11. Therefore, the current flowing through the resistor R12 becomes VE/R12. Then, the current i flowing through the resistor R11 gradually increases with time (as the capacitor C11 is charged) and, finally, the current i is held constant at the high level where i=VE/(R11+R12). Thus, at the moment when the electrical signal Vin becomes high (on the rising edge), the current i is compensated in bandwidth in the positive direction ((b) of FIG. 2). On the other hand, when the electrical signal Vin ((a) of FIG. 2) supplied to the base of the transistor Q12 becomes low, the emitter voltage VE at the emitter of the transistor Q12 becomes constant at the low level. At this moment, the current i flowing through the resistor R12 becomes approximately 0 by an electric charge stored in the capacitor C11. Then, the current flowing through the resistors R11 and R12 gradually increases with time (as the capacitor C11 is discharged) and, finally, the current i is held at the low level where i=VE/(R11+R12). Thus, at the moment when the electrical signal Vin becomes low (on the falling edge), the current i is compensated in bandwidth in the negative direction ((b) of FIG. 2).

From the emitter to the collector of the transistor Q13 flows a current equal in amount to the current i flowing through the resistor R12. This current through the transistor Q13 is mirror-multiplied by a resistance ratio between the resistors R13 and R14, and flows from the emitter to the collector of the transistor Q14. This mirror-multiplied current is supplied as a signal current I0 from the collector of the transistor Q14 to the constant-current source 14 and the LED 15. Thus, this signal current I0 has a band-compensated waveform ((b) of FIG. 2).

The constant-current source 14 generates a predetermined current Id. Supplied to the LED 15 is therefore an injection current Iin obtained by subtracting the current Id from the signal current I0 (Iin=I0−Id). Here, by optimally adjusting the current Id of the constant-current source 14, the injection current Iin supplied to the LED 15 can be brought down closely to 0 at the low level while the signal amplitude is held constant ((c) of FIG. 2). Thus, the light output Pout from the LED 15 ((d) of FIG. 2) is suppressed at the low level without any change in signal amplitude. Therefore, noise components added at the time of emitting light at the low level can be suppressed. Consequently, the S/N ratio of the digital signal after POF transmission is improved, and therefore good transmission capabilities can be obtained.

With reference to FIG. 3, described next is the requirements for realizing the light-emitting device drive circuit according to the embodiment of the present invention. FIG. 3 is a diagram showing one example of forward voltage VF-injection current Iin characteristics of the LED 15 with respect to wavelengths. In FIG. 3, the characteristics are shown for five light-emission wavelengths, 570 nm, 650 nm, 850 nm, 1300 nm, and 1550 nm. As is evident from FIG. 3, shorter the wavelength is, larger the forward voltage VF becomes.

The above constant-current source 14 is normally implemented by a transistor as a basic component. Therefore, the constant-current source 14 needs approximately 2V for stable operation including 0.7V required for a forward-voltage decrease at a PN junction of the transistor. Therefore, in the present invention, a light source whose forward voltage VF is more than 2V must be used.

Here, in FIG. 3, in a practical region where the injection current Iin is more than 10 mA, short-wavelength light sources for 650 nm and 570 nm satisfy VF>2V. That is, if an LED for 640 to 660 nm is selected as a PMMA-type POF light source, for example, the light-emitting device drive circuit with the constant-current source 14 provided parallel to the LED 15 can be achieved as shown in FIG. 1.

As described above, in the light-emitting device drive circuit according to the embodiment of the present invention, bandwidth compensation is performed by the differentiating circuit, and the LED 15 is driven by the injection current Iin obtained by subtracting the predetermined current Id from the signal current I0.

Thus, light emission when the digital signal is low can be sufficiently suppressed at the time of bandwidth compensation of the LED 15. Accordingly, deterioration in S/N ratio can be suppressed, thereby achieving high-quality, long-distance transmission.

Each detailed circuit structure of the current compensation circuit 11 and the signal current source 13 is only a typical example, and not restrictive. Therefore, as long as the signal current I0 can be obtained by compensating the inputted electrical signal Vin in bandwidth, any other circuit structure can be used for these circuits.

While the invention has been described in detail, the foregoing description is in all aspects illustrative and not restrictive. It is understood that numerous other modifications and variations can be devised without departing from the scope of the invention.

What is claimed is:

1. A circuit that drives a light-emitting device based on an inputted digital signal, said circuit comprising:
   an npn transistor, supplied at a base thereof with an electrical signal corresponding to said digital signal, for outputting a voltage at a high or low level to an emitter thereof based on the electrical signal;
   a current compensation circuit, connected to the emitter of said transistor, for compensating an output current of a collector of said transistor at a rising edge when an emitter voltage of said transistor is at the high level, and compensating the output current at a falling edge when the emitter voltage of said transistor is at the low level;
   a signal current source, connected to the collector of said transistor, for amplifying said output current by a predetermined multiplication factor, and outputting a signal current;
   a constant-current source, connected to said signal current source in serial, for diverting a part of direct current components of said signal current outputted from said signal current source; and
   a light-emitting device, connected to said signal current source in serial and to said constant-current source in parallel and supplied with an injection current obtained by subtracting the diverted part from said signal current, for emitting light based on the injection current.

2. The light-emitting device drive circuit according to claim 1, wherein
   said current compensation circuit comprises:
      a first resistor with one end thereof connected to the emitter of said transistor,
      a second resistor with one end thereof connected to the other end of said first resistor and with the other end thereof grounded, and
      a capacitor connected to said first resistor in parallel.

3. The light-emitting device drive circuit according to claim 1, wherein
   said signal current source is a current mirror amplifier composed of at least two pnp transistors.

4. The light-emitting device drive circuit according to claim 2, wherein
   said signal current source is a current mirror amplifier composed of at least two pnp transistors.

5. The light-emitting device drive circuit according to claim 1, wherein
   said light-emitting device is supplied at an anode thereof with said injection current and is grounded at a cathode thereof.

6. The light-emitting device drive circuit according to claim 4, wherein
   said light-emitting device is supplied at an anode thereof with said injection current and is grounded at a cathode thereof.

7. The light-emitting device drive circuit according to claim 1, wherein
   said light-emitting device emits light with a wavelength having an optical spectral characteristic of a band from 450 to 540 nm.

8. The light-emitting device drive circuit according to claim 2, wherein
   said light-emitting device emits light with a wavelength having an optical spectral characteristic of a band from 450 to 540 nm.

9. The light-emitting device drive circuit according to claim 3, wherein
   said light-emitting device emits light with a wavelength having an optical spectral characteristic of a band from 450 to 540 nm.

10. The light-emitting device drive circuit according to claim 4, wherein
    said light-emitting device emits light with a wavelength having an optical spectral characteristic of a band from 450 to 540 nm.

11. The light-emitting device drive circuit according to claim 5, wherein
    said light-emitting device emits light with a wavelength having an optical spectral characteristic of a band from 450 to 540 nm.

12. The light-emitting device drive circuit according to claim 6, wherein
    said light-emitting device emits light with a wavelength having an optical spectral characteristic of a band from 450 to 540 nm.

13. The light-emitting device drive circuit according to claim 1, wherein
    said light-emitting device emits light with a wavelength having an optical spectral characteristic of a band from 560 to 580 nm.

14. The light-emitting device drive circuit according to claim 2, wherein
    said light-emitting device emits light with a wavelength having an optical spectral characteristic of a band from 560 to 580 nm.

15. The light-emitting device drive circuit according to claim 3, wherein
    said light-emitting device emits light with a wavelength having an optical spectral characteristic of a band from 560 to 580 nm.

16. The light-emitting device drive circuit according to claim 4, wherein
said light-emitting device emits light with a wavelength having an optical spectral characteristic of a band from 560 to 580 nm.

17. The light-emitting device drive circuit according to claim 5, wherein
said light-emitting device emits light with a wavelength having an optical spectral characteristic of a band from 560 to 580 nm.

18. The light-emitting device drive circuit according to claim 6, wherein
said light-emitting device emits light with a wavelength having an optical spectral characteristic of a band from 560 to 580 nm.

19. The light-emitting device drive circuit according to claim 1, wherein
said light-emitting device emits light with a wavelength having an optical spectral characteristic of a band from 640 to 660 nm.

20. The light-emitting device drive circuit according to claim 2, wherein
said light-emitting device emits light with a wavelength having an optical spectral characteristic of a band from 640 to 660 nm.

21. The light-emitting device drive circuit according to claim 3, wherein
said light-emitting device emits light with a wavelength having an optical spectral characteristic of a band from 640 to 660 nm.

22. The light-emitting device drive circuit according to claim 4, wherein
said light-emitting device emits light with a wavelength having an optical spectral characteristic of a band from 640 to 660 nm.

23. The light-emitting device drive circuit according to claim 5, wherein
said light-emitting device emits light with a wavelength having an optical spectral characteristic of a band from 640 to 660 nm.

24. The light-emitting device drive circuit according to claim 6, wherein
said light-emitting device emits light with a wavelength having an optical spectral characteristic of a band from 640 to 660 nm.

25. An optical transmission system for transmitting, through a transmission medium, an optical signal outputted from a light-emitting device drive circuit that drives a light-emitting device based on an inputted digital signal, and
the light-emitting device drive circuit includes
an npn transistor, supplied at a base thereof with the an electrical signal corresponding to said digital signal, for outputting a voltage at a high or low level to an emitter thereof based on the electrical signal;
a current compensation circuit, connected to the emitter of said transistor, for compensating an output current at a rising edge of a collector of said transistor when an emitter voltage of said transistor is at the high level, and compensating the output current at a falling edge when the emitter voltage of the transistor is at the low level;
a signal current source, connected to the collector of the transistor, for amplifying said output current by a predetermined multiplication factor, and outputting a signal current;
a constant-current source, connected to said signal current source in serial, for diverting a part of direct current components of said signal current outputted from said signal current source; and
a light-emitting device, connected to said signal current source in serial and to said constant-current source in parallel and supplied with an injection current obtained by subtracting the diverted part from said signal current, for emitting light based on the injection current, wherein
to the transmission medium, at least part of the optical signal outputted from the light-emitting device is coupled, and the transmission medium is capable of transmitting at least part of the coupled optical signal.

26. The optical transmission system according to claim 25, wherein
said current compensation circuit comprises:
a first resistor with one end thereof connected to the emitter of said transistor,
a second resistor with one end thereof connected to the other end of said first resistor and with the other end thereof grounded, and
a capacitor connected to said first resistor in parallel.

27. The optical transmission system according to claim 25, wherein
said signal current source is a current mirror amplifier structured by at least two pnp transistors.

28. The optical transmission system according to claim 26, wherein
said signal current source is a current mirror amplifier structured by at least two pnp transistors.

29. The optical transmission system according to claim 25, wherein
said light-emitting device is supplied with the injection current at an anode thereof and is grounded at a cathode thereof.

30. The optical transmission system according to claim 28, wherein
said light-emitting device is supplied with the injection current at an anode thereof and is grounded at a cathode thereof.

31. The optical transmission system according to claim 25, wherein
said light-emitting device emits light within an optical spectral band of 450 to 540 nm.

32. The optical transmission system according to claim 26, wherein
said light-emitting device emits light with a wavelength having an optical spectral characteristic of a band from 450 to 540 nm.

33. The optical transmission system according to claim 27, wherein
said light-emitting device emits light with a wavelength having an optical spectral characteristic of a band from 450 to 540 nm.

34. The optical transmission system according to claim 28, wherein
said light-emitting device emits light with a wavelength having an optical spectral characteristic of a band from 450 to 540 nm.

35. The optical transmission system according to claim 29, wherein
said light-emitting device emits light with a wavelength having an optical spectral characteristic of a band from 450 to 540 nm.

36. The optical transmission system according to claim 30, wherein
said light-emitting device emits light with a wavelength having an optical spectral characteristic of a band from 450 to 540 nm.

37. The optical transmission system according to claim 25, wherein
said light-emitting device emits light with a wavelength having an optical spectral characteristic of a band from 560 to 580 nm.

38. The optical transmission system according to claim 26, wherein
said light-emitting device emits light with a wavelength having an optical spectral characteristic of a band from 560 to 580 nm.

39. The optical transmission system according to claim 27, wherein
said light-emitting device emits light with a wavelength having an optical spectral characteristic of a band from 560 to 580 nm.

40. The optical transmission system according to claim 28, wherein
said light-emitting device emits light with a wavelength having an optical spectral characteristic of a band from 560 to 580 nm.

41. The optical transmission system according to claim 29, wherein
said light-emitting device emits light with a wavelength having an optical spectral characteristic of a band from 560 to 580 nm.

42. The optical transmission system according to claim 30, wherein
said light-emitting device emits light with a wavelength having an optical spectral characteristic of a band from 560 to 580 nm.

43. The optical transmission system according to claim 25, wherein
said light-emitting device emits light with a wavelength having an optical spectral characteristic of a band from 640 to 660 nm.

44. The optical transmission system according to claim 26, wherein
said light-emitting device emits light with a wavelength having an optical spectral characteristic of a band from 640 to 660 nm.

45. The optical transmission system according to claim 27, wherein
said light-emitting device emits light with a wavelength having an optical spectral characteristic of a band from 640 to 660 nm.

46. The optical transmission system according to claim 28, wherein
said light-emitting device emits light with a wavelength having an optical spectral characteristic of a band from 640 to 660 nm.

47. The optical transmission system according to claim 29, wherein
said light-emitting device emits light with a wavelength having an optical spectral characteristic of a band from 640 to 660 nm.

48. The optical transmission system according to claim 30, wherein
said light-emitting device emits light with a wavelength having an optical spectral characteristic of a band from 640 to 660 nm.

49. The optical transmission system according to claim 25, wherein
said transmission medium is a polymethyl methacrylate (PMMA) type plastic optical fiber (POF).

50. The optical transmission system according to claim 26, wherein
said transmission medium is a polymethyl methacrylate (PMMA) type plastic optical fiber (POF).

51. The optical transmission system according to claim 27, wherein
said transmission medium is a polymethyl methacrylate (PMMA) type plastic optical fiber (POF).

52. The optical transmission system according to claim 28, wherein
said transmission medium is a polymethyl methacrylate (PMMA) type plastic optical fiber (POF).

53. The optical transmission system according to claim 29, wherein
said transmission medium is a polymethyl methacrylate (PMMA) type plastic optical fiber (POF).

54. The optical transmission system according to claim 30, wherein
said transmission medium is a polymethyl methacrylate (PMMA) type plastic optical fiber (POF).

55. The optical transmission system according to claim 31, wherein
said transmission medium is a polymethyl methacrylate (PMMA) type plastic optical fiber (POF).

56. The optical transmission system according to claim 32, wherein
said transmission medium is a polymethyl methacrylate (PMMA) type plastic optical fiber (POF).

57. The optical transmission system according to claim 33, wherein
said transmission medium is a polymethyl methacrylate (PMMA) type plastic optical fiber (POF).

58. The optical transmission system according to claim 34, wherein
said transmission medium is a polymethyl methacrylate (PMMA) type plastic optical fiber (POF).

59. The optical transmission system according to claim 35, wherein
said transmission medium is a polymethyl methacrylate (PMMA) type plastic optical fiber (POF).

60. The optical transmission system according to claim 36, wherein
said transmission medium is a polymethyl methacrylate (PMMA) type plastic optical fiber (POF).

61. The optical transmission system according to claim 37, wherein
said transmission medium is a polymethyl methacrylate (PMMA) type plastic optical fiber (POF).

62. The optical transmission system according to claim 38, wherein
said transmission medium is a polymethyl methacrylate (PMMA) type plastic optical fiber (POF).

63. The optical transmission system according to claim 39, wherein
said transmission medium is a polymethyl methacrylate (PMMA) type plastic optical fiber (POF).

64. The optical transmission system according to claim 40, wherein
said transmission medium is a polymethyl methacrylate (PMMA) type plastic optical fiber (POF).

65. The optical transmission system according to claim 41, wherein said transmission medium is a polymethyl methacrylate (PMMA) type plastic optical fiber (POF).

66. The optical transmission system according to claim 42, wherein said transmission medium is a polymethyl methacrylate (PMMA) type plastic optical fiber (POF).

67. The optical transmission system according to claim 43, wherein said transmission medium is a polymethyl methacrylate (PMMA) type plastic optical fiber (POF).

68. The optical transmission system according to claim 44, wherein said transmission medium is a polymethyl methacrylate (PMMA) type plastic optical fiber (POF).

69. The optical transmission system according to claim 45, wherein said transmission medium is a polymethyl methacrylate (PMMA) type plastic optical fiber (POF).

70. The optical transmission system according to claim 46, wherein said transmission medium is a polymethyl methacrylate (PMMA) type plastic optical fiber (POF).

71. The optical transmission system according to claim 47, wherein said transmission medium is a polymethyl methacrylate (PMMA) type plastic optical fiber (POF).

72. The optical transmission system according to claim 48, wherein said transmission medium is a polymethyl methacrylate (PMMA) type plastic optical fiber (POF).

* * * * *